3,334,055
STEAM REFORMING PROCESSES
Dennis Albert Dowden and Phineas Davies, Norton-on-Tees, England, assignors to Imperial Chemical Industries Limited, London, England, a corporation of Great Britain
No Drawing. Filed July 8, 1963, Ser. No. 293,269
Claims priority, application Great Britain, July 13, 1962, 26,997/62; July 30, 1962, 29,122/62; Jan. 21, 1963, 2,564/63
11 Claims. (Cl. 252—473)

The present invention relates to hydrocarbon steam reforming processes, to catalysts for use in such processes and to the product of the process. It particularly relates to the production of gases useful in town gas manufacture.

Catalysts available commercially for the steam reforming of hydrocarbons often contain nickel and a support material, among such support materials being included magnesia, kaolin and a hydraulic binding agent. Cobalt may be used instead of nickel but generally gives catalysts of much lower activity. An object of the present invention is to improve the activity of such catalysts. A further object in accordance with a preferred feature of the invention is to provide catalysts which are highly active at temperatures suitable for the production of gases containing a substantial proportion of methane.

The invention provides a steam reforming catalyst composition comprising nickel or cobalt present as the metal or a compound of nickel or cobalt reducible to the metal, a refractory support material, and a platinum group metal present as the metal or as a compound thereof reducible to the metal, in a small amount sufficient to increase the activity of the catalyst composition.

The invention also provides a process of steam reforming hydrocarbons boiling up to 350° C. and preferably in the range 30° C. to 350° C. by reacting the said hydrocarbons with steam at an elevated temperature in the presence of the above defined catalyst composition to yield mixed gases including CO and $H_2$.

The presence of a platinum group metal substantially increases, in general, the activity of a nickel or cobalt on refractory support catalyst, the increase being in general very much greater than the activity of the platinum group metal on its own. Also, in some cases, particularly when ruthenium is used, the presence of such a metal or compound may reduce the tendency of the catalyst to laydown carbon particularly at the lower temperatures i.e. below about 650° C. provided that the amount of such metal is not too great.

According to a preferred feature of the invention there is provided a process of hydrocarbon steam reforming for the production of gases containing substantial quantities of methane useful in town gas manufacture wherein a hydrocarbon boiling at temperatures up to 350° C., preferably in the range 30° C.–350° C., and particularly such a hydrocarbon boiling in the range 30° C.–170° C., is reacted with steam at a temperature in the range 450° C–700° C. preferably 550° C.–675° C. at a pressure above 100 p.s.i.g. and a steam ratio below 4 in the presence of a steam reforming catalyst composition comprising nickel or cobalt present as the metal or as a compound reducible to the metal, a refractory support material, a platinum or ruthenium metal or a compound thereof reducible to the metal in an amount of 0.001%–0.5% by weight, preferably 0.002%–0.1% thereof.

According to a further feature of the invention, in the catalyst composition defined above there is also present a small amount of an alkali or alkaline earth metal compound whereby the tendency of the composition to catalyse the deposition of carbon is reduced.

By a platinum group metal in this specification we mean any of the metals ruthenium, rhodium, palladium, osmium, iridium and platinum or mixtures thereof. Rhodium, platinum and ruthenium are preferred platinum group metals because of their effectiveness. The platinum group metal may be present in an amount ranging from 0.001% to 0.5% by weight. For the best results with the most economic use of the platinum group metal it is preferred to use between 0.002% and 0.1% thereof.

The platinum group metal may be incorporated into the catalyst composition in a variety of ways. Conveniently a catalyst composition containing nickel or cobalt, or a refractory support material, preferably in its unreduced state, is impregnated with the metal or a reducible compound thereof by contacting the composition with a solution of such compound, e.g. a salt, e.g. rhodium nitrate (the chlorides were used in some of the examples herein because of their availability but the use of halogen containing platinum group metal compounds is preferably avoided as halogens are catalyst poisons and may lead to plant corrosion).

When a platinum group metal compound is incorporated into the catalyst by impregnation it is preferred that the platinum group metal is present as a halogen free anion not hydrolysed in neutral aqueous solution. Thus Pt is conveniently in the form of a complex nitrite e.g. $H_2Pt(NO_2)_4$ or a salt thereof and ruthenium is conveniently in the form of a per-ruthenate. If the platinum group metal is placed on a refractory support material by impregnation the nickel or cobalt compound may be placed thereon at the same time or later as desired. In another method the platinum group metal may be introduced into the catalyst composition during its preparation e.g. by mixing the metal or a reducible compound thereof with the wet mud or filter cake of precipitated nickel or cobalt compounds.

The catalyst composition may conveniently contain from 3.0% to 80%, preferably from 5% to 50% by weight of nickel or cobalt calculated as NiO or CoO respectively, and preferably from 95% to 50% by weight of refractory oxide material calculated on the weight of the catalyst after calcination at 900° C.

The catalyst composition more preferably contains between 12%–31% of nickel or cobalt calculated as aforesaid as nickel or cobalt oxide. For example about 18% is a convenient amount.

In accordance with the further feature of the invention the catalyst composition also contains an alkali or alkaline earth metal compound conveniently in an amount of at least 0.5% by weight calculated as the equivalent weight of $K_2O$ as aforesaid. Usually and desirably the amount of the alkali or alkaline earth metal compound does not exceed an amount equivalent to 11% by weight of potassium oxide. The catalyst composition preferably contains an alkali or alkaline earth metal compound in an amount equivalent to between 1.0% and 7.0% by weight of potassium oxide calculated as aforesaid. A mixture of alkali metal and/or alkaline earth metal compounds can be used. In this case the proportion of each alkali and alkaline earth metal compound is stated as the equivalent amount of potassium oxide expressed as aforesaid, and these amounts are summed. Conveniently, the alkali or alkaline earth metal compound is added as the oxide or a compound which is capable of being decomposed to oxide on heating, e.g. under the conditions used, for instance for the reduction of the nickel or cobalt compound or in steam reforming. The hydroxides are preferred, but carbonates, bicarbonates and organic salts may also be used.

In the case of the catalyst containing little of an acidic oxide such as silica e.g. 5% to 2% or less, e.g. a catalyst based on alumina and magnesia, the proportion of alkali and alkaline earth metal compound e.g. oxide is preferably not less than the amount equivalent to 1.0% by weight of potassium oxide. In the case of a catalyst containing a substantial proportion of an acidic oxide such as silica, e.g. more than 10% for example from 10% to 20% by weight for instance a catalyst based on china clay and alumina and/or magnesia, the proportion of alkali or alkaline earth metal compound is preferably not less than an amount equivalent to 3% by weight of potassium oxide so that the acidic oxide is sufficiently neutralised to reduce effectively any carbon deposition. For intermediate amounts of acidic oxide e.g. 5% to 10% of silica, suitable intermediate amounts of alkali or alkaline earth metal compound are preferably used.

When an alkali metal or alkaline earth metal is present in the catalyst, care should be taken to prevent interaction between it and the platinum group metal compound and care should preferably also be taken to avoid hydrolysis of the latter. Thus, for example, if a catalyst containing a support material and nickel oxide is first impregnated with e.g. an alkali metal hydroxide and dried and then is impregnated with certain platinum group metal compounds e.g. $H_2PtCl_6$ or $Rh(NO_3)_3$, the catalyst tends to behave as if the platinum group metal had not been added. If the order of impregnation is reversed the catalyst tends to behave as if the alkali metal hydroxide had not been added and intermediate effects of the additives are obtained if both are added together. These effects are however substantially reduced or eliminated if the platinum group metal is in the form of a halogen free anion not hydrolysed in aqueous solution. Another way of reducing or eliminating these effects is to react the alkali or alkaline earth metal compound with the support material before impregnation with the platinum group metal compound. This may be done by heating the support material with an alkali or alkaline earth metal compound with the support of an elevated temperature, either before the nickel or cobalt compound is mixed with the support as in our co-pending British Patent 1,040,066 or after the nickel or cobalt compound is mixed therewith as in our co-pending British Patent 1,003,702.

Preferably because it is more effective an alkali metal is used and potassium is preferred because of its effectiveness and reasonable cost. Lithium and sodium are also effective.

The refractory support material may be selected for example from the oxides of magnesium, calcium, strontium, barium, aluminium, silicon (in combined form), titanium, zirconium, thorium or chromium, or a mixture or compound of two or more of these oxides. The oxides of barium, strontium and calcium are preferably present in combined form. If they are present as the free oxides then it is advisable to have present a hydraulic binding agent such as aluminous cement or Portland cement, because a stronger catalyst is thereby obtained. Aluminous cement such as "Ciment Fondu" (registered trademark) is preferred because of the substantial absence of silica and quicker setting. A very satisfactory refractory support material comprises magnesia and alumina, or an aluminosilicate, e.g. china clay. The use of an alumino-silicate containing refractory support material affords catalyst shapes of relatively high mechanical strength. If a high mechanical strength is not required, it is preferred to avoid the use of silica containing materials. The refractory support material may consist predominantly or wholly of aluminous cement, but this has the disadvantage that there is a tendency to break down to dust. When aluminous cement is present, preferably the proportion thereof should be from 20% to 60% by weight of the combined weight of nickel oxide and other refractory support material.

When the alkali or alkaline earth metal compound is readily soluble in water, it is preferred to apply it by treating the catalyst composition, preferably in the unreduced condition, with an aqueous solution of the compound, but if desired the reduced catalyst may be treated with an aqueous solution thereof.

However if relatively insoluble compounds of the alkali metals or alkaline earth metals are used, such as the oxides, the hydroxides or carbonates of the alkaline earth metals, then they may be introduced into the catalyst composition during its preparation, e.g. by mixing them with the wet mud or filter cake of precipitated nickel or cobalt compounds. Being relatively insoluble they are not leached out to any serious extent during the process of manufacture. From about 1% to 5% of calcium oxide, 2% to 5% of barium oxide, or 1.5% to 5% of strontium oxide are suitable in the case of catalysts based on magnesia and alumina and/or china clay.

The catalyst shapes may be of any of the common forms, but are preferably rings on account of the lower pressure drop which they afford in the case of synthesis gas manufacture and are preferably small pellets having increased activity on account of their larger exposed surface in the case of methane containing gas manufacture at the lower temperatures.

The catalyst may be prepared, for example, by precipitating a nickel or cobalt compound, readily decomposable to the oxide by heating e.g. nickel or cobalt carbonate, from a hot solution of a nickel or cobalt compound e.g. nickel or cobalt nitrate, by means of a suitable reagent, e.g. sodium carbonate solution: and adding to the slurry with constant stirring the refractory support material e.g. china clay and magnesia powder, preferably as an aqueous suspension. The heated mixture diluted with more water, if necessary, is filtered, and the filter cake is washed free from alkali, dried and then ignited at about 400° C. The milled product is mixed with e.g. about a third of its weight of aluminous cement, pelleted and then crushed to yield small grains. These are mixed with a little graphite and pelleted. The pellets are heated in a moist atmosphere at a moderate temperature, soaked in water to set the cement, dried and then immersed in aqueous solution of a soluble alkali or alkaline earth metal compound, e.g. caustic potash and dried. The dry pellets are then immersed in a solution of a platinum group metal compound, and the mixture is stirred. The platinum group metal impregnated pellets are dried at a moderate temperature, for example 120° C.

Alternatively, in the above procedure the mixture may be mixed with an amount of water slightly less (on a weight basis) than the amount of aluminous cement before pelleting, and the pelleting conducted without graphite. The pellets are sprayed with water and allowed to harden e.g. for three days. They are then treated by immersion in an aqueous solution of a soluble alkali or alkaline earth metal compound for a short time to take up the desired amount of alkali, or are sprayed several times with that solution. The pellets after drying are impregnated with a platinum group metal compound by the same method as described above.

A second type of catalyst is made similarly to that just described, but mixed alumina and magnesia are used as refractory oxides.

The prepared catalyst composition can be activated (reduced), by heating it in a current of hydrogen or during use in a steam reforming process, whereby for instance nickel oxide is reduced to nickel and/or the platinum group metal compound is reduced to the metal.

The preferred application of the process is to substantially saturated hydrocarbons, but it may also be applied to saturated hydrocarbons containing also a minor amount, e.g. up to 20%, of unsaturated or aromatic hydrocarbons. It is particularly useful, in its preferred form, for steam reforming normally liquid hydrocarbons under conditions, e.g. low steam ratios, where carbon deposition tends to occur. Thus, a straight run petroleum distillate boiling in the range 30° C. to 220° C. may be used, or even up to 270° C. Liquefied petroleum gases and natural gases may also be used as the feedstock. The product may contain besides CO and $H_2$ up to 38% e.g. 8% to 20% by volume of $CO_2$.

For synthesis or low methane containing gas production the temperature may conveniently be in the range 600° C. to 1000° C.; 700° C. to 900° C. is particularly suitable. The pressure may be for instance between 1 and 50 atmospheres absolute; 1 to 25 atmospheres absolute is particularly convenient. The appropriate operating temperature is dependent on the pressure used and the composition of the gas which it is desired to obtain as a product of the process. In practice to produce gases having a high proportion of $H_2$ and CO, a temperature of 700° C. to 800° C. is generally convenient. The steam ratio may be, for example, between 1.5 and 6, and is preferably between 2 and 5. By the term steam ratio is meant the number of molecules of steam employed per atom of carbon in the reaction hydrocarbon.

The invention may also be applied to the production of gases containing substantial quantities of methane useful in town gas manufacture from non-methane feedstocks by operating at temperatures in the range of 450° C. to 700° C. preferably 550° C. to 675° C., pressures above 100 p.s.i.g. and low steam ratios such as 1.5 to 4, particularly 2 to 3, while the space velocity is kept sufficiently low to convert substantially all of the hydrocarbons.

Thus, to produce a gas containing amounts of methane in the range 20%–40% for instance to produce a gas suitable for distribution as town gas, it is preferred that the pressure used in the reforming process is at least 100 p.s.i.g. and is preferably above 350 p.s.i.g. Again, to increase the amount of methane in the product gas, it is preferred to use as low a steam ratio as possible consistent with the avoidance of undue carbon laydown on the catalyst composition. Thus, as before mentioned, steam ratios in the range 1.5–4 and particularly in the range 2–3 are suitable.

It is to be noted that many of the examples given hereafter are of the nature of tests carried out at atmospheric pressure and often under severe conditions of steam ratio and space velocity in order to test the capabilities of the catalyst composition. Under conditions of practical use higher pressures and lower space velocities are preferably used.

In general, on increasing the amount of platinum or ruthenium in the catalyst, the activity increases rapidly to a maximum after which increased amounts of the expensive platinum or ruthenium bring no further benefit and may, in some cases, induce increased carbon lay-down on the catalyst. Thus, in many cases, amounts of platinum in the range 0.005–0.02% are convenient and amounts of ruthenium in the range 0.01 to 0.05% are convenient.

It has been observed that the rate of carbon formation on the catalyst composition is less at 500° C. than at 600° C. For the nickel/kaolin/magnesia/platinum/potassium oxide catalyst composition used in Example 6 herein it was noted that carbon lay-down rapidly increased above about 570° C. Accordingly for such a catalyst composition it is preferred to use a temperature in the range 470° C.–570° C. For the nickel/silica platinum catalyst composition of Example 6, the corresponding rapid increase in carbon lay-down took place above about 625° C. and accordingly, for such a catalyst composition it is preferred to work at a temperature in the range 470° C.–425° C. It is believed that the upper temperature limit is correlated with the specific area of the catalyst composition. In general it is preferred to work at a temperature of 470° C. to that temperature at which, under the conditions of steam ratio, space velocity and pressure used, the rate of carbon lay-down rapidly commences to increase. This temperature is readily ascertainable experimentally in any given case.

It has also been observed that the addition of hydrogen to the feed gases decreases the tendency to carbon lay-down without substantially decreasing the activity of the catalyst composition. This is surprising as in the case of similar catalyst compositions not containing platinum of ruthenium, the addition of hydrogen to the feed gases appeared to both decrease the activity of the catalyst composition and increase carbon lay-down.

The catalyst composition should not be heated to a high temperature after the platinum thereon has been reduced to the metallic form, otherwise it sinters and the activity is reduced. In general, it is preferred not to heat the catalyst composition in this condition to above 700° C. and more preferably not to above 650° C. As a general working rule it is best not to heat the catalyst composition during treatments before reforming commences to temperatures substantially above those which the catalyst will attain during the steam reforming process.

The catalyst composition should preferably not contain sulphur or halogens and if the platinum group metal is put onto the catalyst composition as a halide, the halogen is preferably removed by a pre-reduction treatment with hydrogen before the catalyst composition is used. The feed hydrocarbons should not contain more than 10 p.p.m. of sulphur and, for town gas making, it is preferred that they contain as little sulphur as conveniently possible e.g. less than 5 p.p.m. by weight.

Convenient processes for town gas production are the single stage process of our British Patent 1,032,751 and the two-stage processes of our British Patent 1,032,753 in each of which processes the catalyst composition used (in either stage) is in accordance with this invention.

EXAMPLE 1

A catalyst composition according to the invention was prepared in the following manner.

Nickel nitrate solutions containing 40 kgs. of nickel, diluted with 700 litres of hot water, was heated to 75° C. with stirring, and to the mixture was added, with stirring, 800 litres of a solution containing 93.5 kgs. of sodium carbonate at 75° C., that is, a slight excess. When precipitation was complete there was present, in order to avoid loss of nickel, an excess of at least 0.5 gm. of $Na_2CO_3$ per 100 mls. of the mother liquor. To the mixture there were added, with constant stirring, 66.5 kg. of milled china clay and 29 kgs. of magnesia powder (MgO) as a slurry in 500 litres of water. After dilution of the resulting mixture with 200 litres of hot water and well mixing, it was filtered, and the material on the filter was washed with warm water until substantially free from alkali.

The filter cake was dried, and then heated to 410° C. to 420° C. for seven hours. The product was milled and well mixed with "Ciment Fondu" (Registered trademark) in the ratio 20:8 by weight, and the mixture was pelleted and the pellets crushed to yield material passing a No. 8 British Standard Specification Sieve. This material was mixed with 2% by weight of graphite and pelleted in a rotary pelleting machine. The pellets were then heated at 250° C. in the presence of steam for 12 hours.

The cooled pellets were soaked in water for 24 hours, dried at 100° C. and after cooling were immersed for about 30 minutes in aqueous caustic potash containing 52 gms. KOH/100 mls. They were thereafter immersed in rhodium trichloride solution containing approximately 0.6 gms. of rhodium per 100 mls. and the mixture stirred. The damp pellets were then dried at 120° C. The catalyst composition as above prepared had the following percentage composition by weight:

| | |
|---|---|
| $SiO_2$ | 12.0 |
| $Al_2O_3$ | 21.1 |
| CaO | 9.2 |
| MgO | 11.3 |
| $Na_2O$ | 0.2 |
| $SO_3$ | 0.3 |
| $Fe_2O_3$ | 4.3 |
| NiO | 17.4 |
| $K_2O$ | 5.8 |
| Rh | 0.07 |
| Loss at 900° C. | 18.3 |

Light distillate boiling at 30° C.–170° C. and containing substantially no sulphur was vaporised at a rate of 25 ml./hr. and mixed with steam from water feed at 114 mls./hr. The mixture which had a steam:hydrocarbon ratio as defined aforesaid of 5:1 was fed to a tube of 1" internal diameter containing 10 mls. of a steam reforming catalyst prepared as described above. The tube was uniformly heated in a furnace so that the temperature of the issuing gas was 700° C. The pressure at the exit of the reformer was atmospheric. Under these conditions there was 98% conversion of the light distillate to gas which was produced at a rate of 99 litres/hr. with little deposition of carbon compared with 88% conversion and 79 litres per hour for similar catalyst containing no rhodium. The resulting gas had the following composition by volume:

| | |
|---|---|
| $CO_2$ | 15.0 |
| CO | 12.6 |
| $H_2$ | 69.4 |
| $CH_4$ | 2.1 |
| $C_nH_{2n}$ | 0.5 |
| $O_2$ | 0.3 |

At 600° C. the conversions were 74 and 60% for the rhodium containing catalyst and that not containing rhodium with gas rates of 67 and 47 litres per hour respectively. A similar catalyst was prepared containing 0.14% rhodium but this had substantially the same activity as the catalyst containing 0.07% thereof.

EXAMPLE 2

A catalyst was prepared in a similar manner to that referred to in Example 1 except that before the rhodium chloride was added the catalyst was heated at 700° C. for 4 hours. Two samples B and C of the catalyst were then impregnated with rhodium chloride solution and these, together with a sample A containing no rhodium, were tested under the conditions referred to in Example 1 at 500° C. The rhodium contents and results are shown in the following table:

| Catalyst | A | B | C |
|---|---|---|---|
| Percent Rh | 0 | 0.03 | 0.05 |
| Conversion at 500° C., percent | 72 | 84 | 88 |
| Gas rate | 52 | 60 | 60 |

A catalyst prepared in accordance with Example 1 which was not heated before impregnation with rhodium chloride solution to contain 0.14 rhodium had, at 500° C., only a slightly increased activity compared with a catalyst containing no rhodium.

EXAMPLE 3

A nickel oxide/kaolin/magnesia/aluminous cement catalyst composition was prepared by adding nickel nitrate to sodium carbonate solution at 75° C. and stirring the precipitated basic nickel carbonate with milled china clay (kaolin) and magnesia. The mix was then filtered and washed free of alkaline material. The filter cake was dried, heated at 410° C.–420° C. for several hours, milled, mixed with approximately 30% by weight of "Ciment Fondu" (registered trademark) (which consists of 37%–40% $Al_2O_3$, 37%–40% CaO, 5%–6% $SiO_2$, 12% $Fe_2O_3$ and 2%–8% other materials) dry pelleted, the pellets crushed, sieved, 2% graphite added and the material repelleted as 3/16" diameter pellets. The pellets were then heated at 250° C. with steam to set the cement. The catalyst had the following analysis: $SiO_2$ 13%, $Al_2O_3$ 23%, CaO 10%, MgO 12.35%, $Na_2O$ 0.2%, $SO_3$ 0.3%, $Fe_2O_3$ 4.5%, NiO 18.9%, weight loss at 900° C. 18.5%.

The pellets were treated with platinum chloride solutions and dried. Two catalysts A and B were so prepared, A containing 0.007% Pt and B containing 0.042% Pt.

The activities of the catalysts and an untreated nickel oxide/kaolin/magnesia catalyst were tested at 500° C. and 600° C. using a liquid hydrocarbon space velocity of 1.0 v./v./hr. and a steam ratio of 2.5 with a catalyst volume of 25 ml. in the steam reforming of a straight run petroleum light distillate of B.P. 30° C.–170° C. Before testing, the catalysts were steamed for 1 hour at 500° C. and then reduced with steam and hydrogen for 1½ hours at 500° C. The results are given in Table 1.

The tendency to form carbon of the catalysts A and B and the untreated catalyst was tested at 600° C. (catalyst "life" tests) using a liquid hydrocarbon space velocity of 9.0 and a steam ratio of 2.0 with a catalyst volume of 10 ml. Before testing the catalyst was steamed and reduced as above. The results are given in Table 2.

All tests were conducted at atmospheric pressure using the same petroleum light distillate.

The tables show that at 500° C., the presence of platinum on the catalyst greatly increases the activity and the proportion of methane produced, the gas being nearer to equilibrium over the more active catalyst. At 600° C. the activity is again increased but the methane content is not substantially affected. At 600° C. the life for catalyst A is substantially the same as for untreated catalyst. Catalyst B however, containing an increased amount of platinum, laid down carbon more rapidly than either of the other catalysts.

It is to be noted that the carbon lay-down test is cinducted under severe conditions of high space velocity and low steam ratio in order to induce carbon formation. In practice lower space velocities and/or higher steam ratios should be preferably used.

TABLE 1.—ACTIVITY TESTS

| | Temperature, °C. | | | | | |
|---|---|---|---|---|---|---|
| | 500 | | | 600 | | |
| | Catalyst type | | | | | |
| | Untreated | A | B | Untreated | A | B |
| | Percent Pt | | | | | |
| | 0 | 0.007 | 0.042 | 0 | 0.007 | 0.042 |
| Product: | | | | | | |
| Liquid Water, ml./hr | 50 | 34.5 | 33 | 35 | 29 | 25 |
| Hydrocarbon, ml./hr | 12 | 2 | 2 | 1 | 0.5 | Trace |
| Gas Rate, litres/hr | 46 | 65 | 68 | 95 | 90 | 95 |
| Analysis, percent: | | | | | | |
| $CO_2$ | 19.5 | 20.0 | 18.6 | 13.6 | 14 | 11.8 |
| CO | 5.3 | 6.0 | 7.0 | 14.3 | 13.8 | 17.8 |
| $CH_4$ | [1]2.9 | 11.2 | 9.4 | [1]1.5 | [1]3.2 | [1]1.2 |
| $H_2$ | 71.3 | 62.5 | 64.0 | 68.8 | 68.5 | 68.2 |
| $C_nH_{2n}$ | <0.1 | <0.1 | 0.2 | 0.3 | <0.1 | <0.1 |
| $O_2$ | <0.1 | <0.1 | <0.1 | <0.1 | <0.1 | 0.2 |
| Conversion, percent | 52 | 92 | 92 | 96 | 98 | 100 |
| Yield $(CO+H_2)$, percent | 38 | 47 | 51 | 84 | 79 | 87 |
| Comments | Catalysts not discharged, proceeded to 600° C. test | | | Some carbon laydown | | Slight carbon laydown |

[1] The low methane concentration is the result of the high space velocity which does not allow the products to come to equilibrium. At lower space velocities much more methane is formed.

TABLE 2.—CATALYST LIFE TESTS

| | Catalyst type | | |
|---|---|---|---|
| | Untreated | A | B |
| | Percent Pt | | |
| | 0 | 0.007 | 0.042 |
| Temperature 600° C.: | | | |
| Duration of run (min.) | 30 | 32 | 18 |
| Exit gas rate (litres/hr.) | 200 | 300–210 | 240–180 |
| Total exit gas (litres) | 93 | 143 | 63 |
| Hydrocarbon recovered, percent | 33 | 52 | 15 |
| Comments | Catalyst choked with carbon | | |
| Time on line before choking (min.) | 30 | 32 | 18 |

EXAMPLE 4

To the nickel oxide/kaolin/magnesia catalyst composition prepared as in Example 3 was added platinum chloride solution and the composition was dried. Together with an untreated composition, the analyses were:

Untreated catalyst U—0% Pt;
Treated catalyst C—0.01% Pt.

The catalysts were treated with steam at 500° C. and reduced with steam and hydrogen at 500° C. and were then tested for activity (Table 3) or were steamed and reduced at 750° C. and tested for carbon lay-down (Table 4) in both cases as in Example 3. In these runs the effect of hydrogen gas injected into the feed gases was noted. The tests were at atmospheric pressure using the same petroleum light distillate as in Example 3.

TABLE 3.—ACTIVITY TESTS

| | Temperature, °C. | | | | | | | |
|---|---|---|---|---|---|---|---|---|
| | 500 | | | | 600 | | | |
| | Catalyst type | | | | | | | |
| | U | U | C | C | U | U | C | C |
| | Percent Pt | | | | | | | |
| | 0 | 0 | 0.01 | 0.01 | 0 | 0 | 0.01 | 0.01 |
| Hydrogen fed to reformer l./hr | 0 | 25 | 0 | 16 | 0 | 25 | 0 | 25 |
| Product: | | | | | | | | |
| Liquid water, ml./hr | 41 | 50 | 34 | 35 | 28 | 30 | 28.5 | 34 |
| Hydrocarbon ml./hr | 7 | 15.5 | 2.2 | 1 | 0.5 | 0.5 | 0 | 0 |
| Gas rate, l./hr.[1] | 49 | 30 | 71 | 69 | 96 | 102 | 95 | 88 |
| Analysis, percent: | | | | | | | | |
| $CO_2$ | 21 | 19.0 | 19.0 | 18.0 | 13.0 | 12.5 | 12.0 | 10.2 |
| CO | 4.8 | 7.3 | 5.2 | 6.9 | 14.4 | 16.3 | 16.3 | 17.4 |
| $CH_4$ | 5.5 | 7.7 | 10.2 | 12.3 | 3.0 | 3.3 | 1.4 | 3.6 |
| $H_2$ | 68.4 | 60.7 | 63.6 | 60.9 | 67.8 | 66.2 | 68.2 | 67.4 |
| $C_nH_{2n}$ | <0.1 | 0.7 | <0.1 | <0.1 | <0.1 | <0.1 | 0.2 | <0.1 |
| $O_2$ | <0.1 | 0.4 | <0.1 | 0.5 | 1.0 | 0.3 | 0.3 | 0.5 |
| Conversion, percent | 72 | 46 | 91 | 96 | 98 | 98 | 100 | 100 |
| Yield $(CO+H_2)$, percent | 38 | 22 | 52 | 50 | 84 | 90 | 85 | 79 |
| Comments | | | ([2]) | ([3]) | ([4]) | ([2]) | ([5]) | ([5]) |

[1] When $H_2$ gas was fed, the gas rate was corrected for this.
[2] Very slight carbon laydown.
[3] Slight carbon laydown.
[4] Catalyst caked with carbon.
[5] No carbon laydown.

TABLE 4.—CATALYST LIFE TESTS

| | Catalyst type | | | |
|---|---|---|---|---|
| | U | | C | |
| | Percent Pt | | | |
| | 0 | | 0.01 | |
| Volume hydrogen added to feed gases° l. hr. | 0 | 25 | 0 | 25 |
| Temperature 600° C.: | | | | |
| Duration of run (min.) | 44 | 20 | 34 | 65 |
| Exit gas rate (l. hr.) | 270 | ¹253 | 210 | ¹210 |
| Total exit gas (litres) | 180 | ¹102 | 128 | ¹205 |
| Hydrocarbon recovered | 11 | 0 | 12 | 15 |
| Comments | Catalyst choked with carbon | | | |
| Time on line before the catalyst choked (min.) | 44 | 20 | 34 | 65 |

¹ Corrected for added hydrogen.

Again the increase in activity in the catalysts containing platinum is to be noted, also there is a greater proportion of methane at 500° C. with such catalysts. Hydrogen addition has little effect on the activity of the platinum containing catalyst and reduces carbon lay-down. On the contrary, with the untreated catalyst, the presence of hydrogen both decreases the catalyst activity and increases the rate of carbon lay-down.

As in Example 3, the above are tests designed to show up differences in activity and the tendency to form carbon. In practice lower space velocities and/or high steam ratios are preferably used.

EXAMPLE 5

The nickel oxide/kaolin/magnesia catalyst composition of Example 3 was impregnated with platinum chloride solution and dried. The catalyst contained 0.08% Pt. The activity was then tested as in Examples 3 and 4 at 500° C. The results are given in Table 5 together with variations in the test conditions.

*For test 1* the catalyst was steamed at 500° C. and reduced with steam and hydrogen at 500° C.

*For test 2* the catalyst was pre-reduced with hydrogen at 250° C. for 2 hours to convert the platinum chloride to the metal, it was then steamed for 1 hour at 500° C. and then reduced with hydrogen and steam for 1½ hours at 500° C.

TABLE 5.—ACTIVITY TESTS AT 500° C.

| Test | 1 | 2 |
|---|---|---|
| Space velocity (liquid vol./vol./hr.) | 1.0 | 1.0 |
| Steam ratio | 2.5 | 2.5 |
| Conversion, percent | 96 | 100 |
| Gas rate (litres/hr.) | 76.2 | 82.6 |
| Gas analysis, percent: | | |
| $CO_2$ | 19.2 | 18.4 |
| $CO$ | 4.8 | 6.6 |
| $CH_4$ | 12.5 | 9.5 |
| $H_2$ | 61.8 | 63.6 |
| $C_nH_{2n}$ | <0.1 | <0.1 |
| $O_2$ | 0.4 | 0.2 |

The tendency to lay-down carbon on the catalyst was tested at 500° C.

*Catalyst life test 1.*—The catalyst was reduced with hydrogen at 250° C., steamed at 500° C. and reduced with steam and hydrogen at 500° C.

*Catalyst life test 2.*—The catalyst was reduced with hydrogen at 250° C., steamed at 600° C. and reduced with steam and hydrogen at 600° C. The results are given in Table 6.

TABLE 6.—CATALYST LIFE TESTS

| Test | 1 | 2 |
|---|---|---|
| Temperature, ° C. | 500 | 600 |
| Space velocity (liquid vol./vol./hr.) | 9 | 9 |
| Steam ratio | 2 | 2 |
| Time for 10″ Hg back pressure to develop across the catalyst (min.) | >480 | 72 |
| Rate of increase of back pressure (in. Hg/hr.) | 0.5 | 7 |

Pre-reduction of the catalyst at 250° C. gives a somewhat more active catalyst. The rate of carbon lay-down is shown to be considerably less at 500° C. than at 600° C.

EXAMPLE 6

The nickel oxide/kaolin/magnesia catalyst composition of Example 3 was impregnated with 0.05% Pt and 5% $K_2O$ (added as KOH) by impregnation with platinum chloride, drying and reduction at 160° C. for 4 hours with hydrogen to remove the chlorine. The catalyst pellets were then impregnated with KOH.

The activity was then tested as in Example 3 at 500° C. The results are given in Table 7 together with variations in the test conditions.

*For test 1* the catalyst was steamed and reduced with hydrogen at 500° C.

*For test 2* the catalyst was pre-reduced with hydrogen at 250° C., steamed at 760° C. and reduced at 730° C.

*For test 3* the catalyst was pre-reduced with hydrogen at 250° C., steamed and reduced at 500° C.

TABLE 7.—ACTIVITY TESTING

| Test | 1 | 2 | 3 |
|---|---|---|---|
| Space velocity (liquid v./v./hr.) | 1.0 | 1.0 | 1.0 |
| Steam ratio | 2.7 | 2.5 | 2.5 |
| Conversion, percent | 95 | 70 | 96 |
| Gas rate (litres/hr.) | 71.3 | 44.8 | 70.7 |
| Gas analysis, percent: | | | |
| $CO_2$ | 20.4 | 19.0 | 20.2 |
| $CO$ | 4.4 | 3.7 | 4.3 |
| $CH_4$ | 9.4 | 4.3 | 9.6 |
| $H_2$ | 64.8 | 70.5 | 65.0 |
| $C_nH_{2n}$ | <0.1 | <0.1 | <0.1 |
| $O_2$ | 0.2 | <0.1 | <0.1 |

The reduction in activity of the test 2 sample is to be noted. This is attributed to the sintering of the platinum metal, believed to take plave above 650° C. and seriously above 700° C.

For "catalyst life tests," the catalyst was pre-reduced with hydrogen at 250° C., and steamed and reduced again with hydrogen for 2 hours at 500° C., 550° C., and 575° C. for tests 1, 2 and 3 respectively. The result is shown in Table 8.

TABLE 8.—CATALYST LIFE TESTS

| Test | 1 | 2 | 3 |
|---|---|---|---|
| Temperature | 500 | 550 | 575 |
| Space velocity (liquid v./v./hr.) | 9 | 9 | 9 |
| Steam ratio | 2 | 2 | 2 |
| Conversion, percent | 36.7 | 49.0 | 57.7 |
| Rate of increase of back pressure (inches Hg/hr.) | 0.5 | 0.5 | 8 |

It was observed that carbon lay-down increased rapidly between 550° C. and 575° C.

Two further catalyst life tests were carried out using catalysts that were pre-reduced, steamed at 760° C. and reduced at 730° C. with hydrogen. In the case of test 4, the catalyst had not been heated at 700° C. before the pre-reduction step; in the case of test 5, the catalyst had been so heated for 8 hours before pre-reduction. It is to be noted that the Test 5 sample laid down carbon on the catalyst much more rapidly than the Test 4 sample, indicating that the effect of heating the catalyst is to sinter the platinum metal with resuling increased tendency to lay down carbon. The results are given in Table 9.

TABLE 9

| Test | 4 | 5 |
|---|---|---|
| Temperature, °C | 600 | 600 |
| Space velocity (liquid vol./vol./hr.) | 9 | 9 |
| Steam ratio | 2 | 2 |
| Conversion (percent) | 53.3 | 72.5 |
| Time for 10″ Hg back pressure to develop across the reformer tube (min.) | 88 | 23 |

EXAMPLE 7

A nickel/platinum on silica catalyst was prepared by co-precipitating nickel hydroxide and silica gel, calcining the product at 400° C.–500° C., pelleting, impregnating with platinum chloride solution and drying. The catalyst obtained contained 41.6% NiO, 0.1% Pt. The catalyst had a specific area of 300 m²/g. and a pore radius of 15A.

*For activity testing* the catalyst was pre-reduced with hydrogen at 250° C. for 2 hours, steamed at 550° C. for 1 hour, reduced with steam and hydrogen for 1½ hours at 500° C. and then tested, as in Example 3, at 500° C. The results are given in Table 10.

Test 2 is for the nickel/silica catalyst not containing platinum.

TABLE 10.—ACTIVITY TEST 500° C.

| | Catalyst | |
|---|---|---|
| | 1. Ni/SiO₂/Pt | 2. Ni/SiO₂ |
| Space velocity (liquid v./v./hr.) | 1.0 | 1.0 |
| Steam ratio | 2.5 | 2.5 |
| Conversion (percent) | 96 | 57 |
| Gas rate, litres/hr | 66.4 | 37 |
| Gas analysis, percent: | | |
| CO₂ | 20 | 19.0 |
| CO | 5.0 | 6.0 |
| CH₄ | 10.3 | 7.1 |
| H₂ | 63.0 | 66.4 |
| CₙH₂ₙ | <0.1 | <0.1 |
| O₂ | 0.4 | 0.2 |

*For life test 1*, the catalyst was pre-reduced at 250° C., steamed at 760° C., and reduced at 730° C. with hydrogen. The results are given in Table 11.

*For life test 2*, the catalyst was pre-reduced at 250° C., steamed and reduced with hydrogen at 500° C. The results are given in Table 11.

*For life test 3*, the catalyst was pre-reduced at 250° C., steamed and reduced at 500° C., and tested at a number of temperatures over the range 500° C.–650° C. The results are given in Table 12.

TABLE 11.—CATALYST LIFE TESTS

| Test | 1 | 2 |
|---|---|---|
| Temperature, °C | 600 | 500 |
| Space velocity (liquid vol./vol./hr.) | 9 | 9 |
| Steam ratio | 2 | 2 |
| Conversion (percent) | 100 | 34 |
| Time for 10″ Hg back pressure to develop (min.) | 25 | >480 |

TABLE 12.—CATALYST LIFE TESTS

| Test | 1 | 2 | 3 | 4 | 5 | 6 |
|---|---|---|---|---|---|---|
| Temperature, °C | 500 | 550 | 575 | 600 | 625 | 650 |
| Space velocity (liquid vol./vol./hr.) | 9 | 9 | 9 | 9 | 9 | 9 |
| Steam ratio | 2 | 2 | 2 | 2 | 2 | 2 |
| Conversion (percent) | 37 | 46 | 49 | 57 | 70 | 84 |
| Rate of increase of back pressure, in. Hg/hr | 0 | 0.1 | 0 | 0.1 | 0.5 | 3 |

Again the tendency to lay down carbon at 500° C. was considerably less than at 600° C. It was observed that a substantial increase in the rate of carbon formation took place between 625° C. and 650° C., a somewhat higher temperature than in the case of the nickel/kaolin/magnesia/platinum/potassium oxide catalyst of Example 6.

EXAMPLE 8

A nickel oxide/kaolin/magnesia/aluminous cement catalyst composition was prepared as in Example 3. This composition was then impregnated with potassium per-ruthenate to give a final Ru content of 0.2%, calcined at 450° C. to convert the KRuO₄ to Ru₂O₅ and K₂O and this catalyst was then treated with steam and reduced with hydrogen and steam at 500° C. It was then tested for its activity in the conversion of straight run petroleum light distillate of boiling range 30° C.–170° C. at temperatures of 450° C., 500° C. and 600° C. at atmospheric pressure with results shown in Table 13.

TABLE 13

| Temperature, °C | Catalyst Volume, ml. | Liquid hydrocarbon space velocity, v./v./hr. | Steam ratio | Percent Conversion |
|---|---|---|---|---|
| 450 | 25 | 1 | 2.5 | 96 |
| 500 | 25 | 1 | 2.5 | 100 |
| 600 | 25 | 2 | 2.5 | 100 |
| 600 | 20 | 2.5 | 2.5 | 97 |

The percent conversion at 500° C. at a space velocity of 1 and steam ratio of 2.5, i.e. 100 is to be compared with a percentage conversion under the same conditions with the catalyst not impregnated with potassium per-ruthenate of 76.

On testing the catalyst for carbon lay-down using a liquid space velocity of 9, a steam ratio of 2 and a temperature of 600° C. at atmospheric pressure the potassium per-ruthenate impregnated catalyst was tested for 150 minutes before choking compared with the catalyst not so impregnated which was tested for 30 minutes and then choked with carbon.

EXAMPLE 9

A nickel oxide/kaolin/magnesia/aluminous cement catalyst composition U was prepared as in Example 3 (before the platinum group metal was added). The composition was impregnated with potassium-per-ruthenate solution to give a final Ru concentration of 0.05% or with H₂PtCl₆ solution to give a final Pt content of 0.05% to give catalysts A and B respectively.

A nickel oxide/kaolin/magnesia/aluminous cement/ K₂O catalyst was prepared according to Example 1, it containeed 6% K₂O. This catalyst was similarly impregnated with Ru or Pt to give catalysts C and D respectively.

The catalysts were tested for their activity in the conversion of straight run petroleum light distillate of boiling range 30° C.–170° C. with steam at temperatures of 450° C. and 600° C. in each case after steaming, and steam and hydrogen reduction at these temperatures. The results are given in Table 14.

TABLE 14

| Catalyst | Temperature, °C. | Space Velocity, v./v./hr. | Steam Ratio | Activity | |
|---|---|---|---|---|---|
| | | | | Percent conversion | Gas rate, litres/hr. |
| U | 450 | 1 | 2.5 | 36 | 23.1 |
| A | 450 | 1 | 2.5 | 92 | 54.5 |
| B | 450 | 1 | 2.5 | 88 | 50.4 |
| C | 600 | 2.5 | 2.5 | 80 | 95.6 |
| D | 600 | 2.5 | 2.5 | 77 | 109.7 |

EXAMPLE 10

Example 8 was repeated using instead of a potassium per-ruthenate solution, a solution of potassium per-ruthenate in potassium hydroxide solution. The catalyst obtained 0.2% Ru and 6.6% K₂O. The catalyst was then tested for percentage conversion as in Example 8 with the results shown in Table 15.

TABLE 15

| Temperature, °C. | Catalyst Volume, ml. | Liquid hydrocarbon space velocity, v./v./hr. | Steam ratio | Percent Conversion |
|---|---|---|---|---|
| 500 | 25 | 1 | 2.5 | 74 |
| 600 | 25 | 2 | 2.5 | 84 |
| 600 | 20 | 2.5 | 2.5 | 73 |

The percentage conversion at 600° C. at a space velocity of 2.5 and steam ratio of 2.5, i.e. 73, compares with a percentage conversion of 97 for the ruthenium impregnated catalyst of Example 8 tested under the same conditions and a percentage conversion of 47 for a catalyst containing 6% $K_2O$ but no platinum group metal prepared as in Example 1. This last catalyst when impregnated with potassium per-ruthenate (0.2% Ru) had a percentage conversion of 75 and a similar catalyst prepared from a catalyst composition which had been heated at 700° C. for several hours as in Example 2 before impregnation with the per-ruthenate (0.2% Ru) had a percentage conversion of 82.

On testing the catalyst for carbon lay-down as in Example 8 the test ran for 510 minutes and after the test the catalyst was found to have very little carbon deposited thereon. This compares with a catalyst containing 6% $K_2O$ but no platinum group metal prepared as in Example 1 which after testing under these conditions for 500 minutes was heavily caked with carbon although not choked.

EXAMPLE 11

Example 8 was repeated using varying amounts of potassium per-ruthenate The catalysts were then steamed, reduced with steam and hydrogen at 500° C. and tested for activity at 450° C. using a liquid space velocity of 1 v./v./hr. and a steam ratio of 2.5. The results are given in Table 16.

TABLE 16

| Percent Ruthenium | Percent Conversion | Gas Rate (litres/hr.) |
|---|---|---|
| ---------- | 36 | 23 |
| 0.01 | 62 | 42 |
| 0.02 | 84 | 51 |
| 0.05 | 92 | 55 |
| 0.10 | 92 | 55 |
| 0.20 | 96 | 55 |

It is thus seen that there is little increase in activity for a ruthenium content above 0.05% and a substantial activity is obtained at 0.02%.

EXAMPLE 12

A catalyst composition containing nickel oxide supported on magnesia, kaolin, and aluminous cement prepared as in Example 3 was impregnated with varying amounts of an aqueous solution of ammonium chloroiridate or an aqueous solution of palladium chloride. The catalysts so prepared were tested for activity in steam reforming the petroleum light distillate of boiling range 30° C.–170° C. with results as shown in Table 17. Some results are also given for similar platinum catalysts.

TABLE 17

| | Ir or Pd, percent by weight | Tests with liquid hydrocarbon space velocity=1 v./v./hr. and steam ratio 2.5 | | | | Tests with s.v.=2.5 v./v./hr., steam ratio=5 | | | |
|---|---|---|---|---|---|---|---|---|---|
| | | 500° C. | | 600° C. | | 600° C. | | 700° C. | |
| | | Gas rate | Percent conversion | Gas rate | Percent conversion | Gas rate | Percent conversion | Gas rate | Percent conversion |
| Sample A | 0.05 Ir | 72 | 90 | 102 | 100 | 33 | 64 | 81 | 90 |
| Sample B | 0.01 Ir | 65 | 90 | 95 | 100 | 21 | 52 | 55 | 92 |
| Sample C | 0.05 Pd | 1 | 12 | | | 22 | 56 | 58 | 92 |
| Sample D | 0.05 Pt | 68 | 92 | 95 | 100 | | | | |

Before testing, all of the catalysts were steamed at 500° C. and then reduced with hydrogen and steam at 500° C.

The low activity of a palladium catalyst at 500° C. is to be noted in contrast with the activity at 600° C. and 700° C. which is similar to that of iridium.

EXAMPLE 13

A catalyst composition containing nickel oxide supported on magnesia, kaolin and aluminous cement prepared as in Example 3 was impregnated with an aqueous solution of a dihydrogen platino-nitrite of approximate formula $H_2Pt(NO_2)_4$ supplied by Johnson and Matthey Ltd. Two catalyst compositions containing nickel oxide supported on magnesia, kaolin and aluminous cement containing 6% potassium oxide prepared as in Example 1 and as in Example 2 were similarly impregnated. These catalysts are referred to in Table 18 as Catalysts A, B and C respectively and in each case the catalyst contained 0.05% Pt. These catalysts were tested for activity in steam reforming the petroleum light distilate of boiling range 30° C.–170° C. with results shown in Table 18. In all cases, before testing the catalysts were steamed at 600° C. and then reduced with steam and hydrogen at 600° C.

TABLE 18

| Catalyst | Tests with s.v.=1 v./v./hr., steam ratio=2.5 | | | | Tests with s.v.=2.5 v./v./hr., steam ratio=2.5 | |
|---|---|---|---|---|---|---|
| | 450° C. | | 500° C. | | Gas rate, l./hr. | Percent conversion |
| | Gas rate, l./hr. | Percent conversion | Gas rate | Percent conversion | | |
| A | 50.4 | 88 | 68 | 100 | | |
| B | | | | | 95.6 | 80 |
| C | | | | | 104 | 78 |

EXAMPLE 14

A catalyst composition was prepared in the same way as that of Example 3 (before addition of the platinum group metal) except that cobalt nitrate was substituted for the nickel nitrate. This composition was either tested at 500° C. and 600° C. as such after steaming and reduction with steam and hydrogen at 500° C. and 600° C. when it was found to be inactive i.e. 0% conversion, or after impregnation with 0.05% Ru added as potassium per-ruthenate. The space velocity was 1 v./v./hr. and the steam ratio was 2.5. At 500° C. this latter catalyst gave 56% conversion and at 600° C. it gave 100% conversion.

We claim:
1. A steam reforming catalyst composition consisting essentially of about 3 to about 80 percent, calculated as the oxide, of an active constituent selected from the class consisting of nickel and cobalt metals and compounds thereof reducible to the metal, a refractory support material and between 0.001 and 0.5% by weight, calculated as the metal, of an activator selected from the class consisting of platinum group metals and their compounds reducible to the metal.

2. A composition according to claim 1 in which the platinum group metal is platinum, present in an amount in the range 0.005 to 0.02% by weight.

3. A composition according to claim 1 in which the platinum group metal is ruthenium present in an amount in the range 0.01 to 0.05% by weight.

4. A composition according to claim 1 which contains a modifier selected from the class of alkali metal and alkaline earth metal compounds in an amount of at least 0.5% by weight calculated as the equivalent weight of potassium oxide.

5. A composition according to claim 1 which contains a modifier selected from the class of alkali and alkaline earth metal compounds in an amount of between 1 and 7% by weight calculated as the equivalent weight of potassium oxide.

6. A composition according to claim 1 which contains a hydraulic cement binding agent.

7. A process for the production of the steam reforming catalyst composition of claim 1 in which a catalyst composition containing the said active constituent and refractory support material is impregnated with a solution of a platinum group metal compound which is not hydrolysed in the said solution.

8. A process according to claim 7 in which a catalyst composition containing the said active constituent, modifier and refractory support material are heated to cause reaction between these components and is then impregnated with the said solution.

9. A process according to claim 7 in which the said refractory support material and modifier are heated to cause reactions between them and are then impregnated with the said solution and active constituent.

10. A process according to claim 7 in which the platinum group metal is in the form of a halogen free anion.

11. A process according to claim 7 in which the said catalyst composition is impregnated with a solution of a platinum group metal compound in which the platinum group metal is in the form of a halogen free anion and with the said modifier.

References Cited

UNITED STATES PATENTS

| | | | |
|---|---|---|---|
| 2,707,706 | 5/1955 | Bauch | 252—472 |
| 2,828,196 | 3/1958 | Glover et al. | 48—214 |
| 2,949,429 | 8/1960 | Bailey et al. | 252—472 |
| 3,103,423 | 9/1963 | Pearce | 252—472 |
| 3,119,667 | 1/1964 | McMahon | 48—214 X |
| 3,184,414 | 5/1965 | Koch et al. | 252—455 |
| 3,186,797 | 6/1965 | Pearce et al. | 252—459 X |
| 3,256,207 | 6/1966 | Arnold | 252—455 |
| 3,271,325 | 9/1966 | Davies et al. | 252—466 |

DANIEL E. WYMAN, *Primary Examiner.*

MORRIS O. WOLK, EDWARD J. MEROS, *Examiners.*

J. SCOVRONEK, C. F. DEES, *Assistant Examiners.*